United States Patent
Bota

[11] Patent Number: 5,094,125
[45] Date of Patent: Mar. 10, 1992

[54] SYSTEM FOR CONTROLLING ENGINE AND AUTOMATIC TRANSMISSION

[75] Inventor: Keiji Bota, Hiroshima, Japan

[73] Assignee: Mazda Motor Corporation, Hiroshima, Japan

[21] Appl. No.: 699,621

[22] Filed: May 15, 1991

[30] Foreign Application Priority Data

May 15, 1990 [JP] Japan ................ 2-124857

[51] Int. Cl.$^5$ ............................... F16H 61/04
[52] U.S. Cl. ....................... 74/858; 74/859; 74/857
[58] Field of Search ................ 74/857, 858, 859

[56] References Cited

U.S. PATENT DOCUMENTS

| | | | |
|---|---|---|---|
| 3,792,630 | 2/1974 | Hause | 74/860 |
| 4,223,573 | 9/1980 | Franssen | 74/858 |
| 4,226,141 | 10/1980 | Espenschied | 74/858 |
| 4,266,447 | 5/1981 | Heess et al. | 74/858 |
| 4,355,550 | 10/1982 | Will et al. | 74/858 X |
| 4,370,903 | 2/1983 | Stroh et al. | 74/858 |
| 4,403,527 | 9/1983 | Mohl et al. | 74/851 |
| 4,685,548 | 8/1987 | Holtermann et al. | 74/857 X |
| 4,724,723 | 2/1988 | Lockhart et al. | 74/858 X |
| 4,933,851 | 6/1990 | Ito et al. | 74/857 X |
| 5,012,695 | 5/1991 | Kydrzuka et al. | 74/859 |

FOREIGN PATENT DOCUMENTS 59-97350 6/1984 Japan .

*Primary Examiner*—Dirk Wright
*Attorney, Agent, or Firm*—Fish & Richardson

[57] ABSTRACT

An automatic transmission containing a multi-stage shift mechanism composed of a planetary gear mechanism is arranged to change the output of the combustion engine in synchronization with its shift operation. The planetary gear mechanism is connected to the output shaft of the combustion engine through the torque converter and is so arranged as to assume four forward speed stages by coupling or uncoupling plural friction coupling elements such as clutches, etc. The number of revolutions of input of the planetary gear mechanism is detected through a sensor by detecting the number of revolutions of the turbine, and the number of revolutions of its output is likewise detected by a sensor. The output of the combustion engine is reduced by retarding the ignition timing as the shift operation is regarded as having been started when a difference between the virtual number of turbine revolution calculated on the basis of the speed stage prior to the shift and the actual number of turbine revolution becomes equal to or larger than a given value. The shift operation is regarded as having been ended when the difference becomes lower than the given value and the reduction of the output of the engine is released.

10 Claims, 4 Drawing Sheets

SYSTEM FOR CONTROLLING ENGINE AND AUTOMATIC TRANSMISSION

BACKGROUND OF THE INVENTION

1. Field of the Invention

The present invention relates to a system for controlling a combustion engine and an automatic transmission and, more particularly, to a system for controlling a combustion engine and an automatic transmission so adapted as to ease a shift shock which may be caused upon starting the operation of shifting the automatic transmission mounted to the automotive vehicle.

2. Description of Related Art

Among automatic transmissions mounted to the automotive vehicles, there have been extensively employed those in combination of a torque converter consisting of a pump impeller, a turbine runner and a stator with a transmission mechanism of a multistage gear type to be connected to the turbine runner of the torque converter. To the automatic transmission is usually mounted a control system of hydraulic pressure circuit type which is so arranged as to shift the states of coupling friction coupling elements such as clutches and brakes in the shift mechanism, thereby performing shift operation.

It is to be noted that, when the shift operation is performed by the automatic transmission, the vehicle speed little changes due to inertia of the automotive vehicle while the number of revolutions of the input shaft changes rapidly in accordance with a gear ratio of the automatic transmission, thereby causing a rapid variation in torque of the output shaft of the automatic transmission. And the acceleration of the automotive vehicle body rapidly changes due to such a rapid variation in the torque of the output shaft of the automatic transmission. In other words, a so-called shift shock may be caused. One of measures to ease such a shift shock is to control the operating oil pressure to be supplied to friction coupling elements in the shift mechanism so as to smoothly couple or uncouple the friction coupling elements. This measures may raise the problem that, when attempts have been made to thoroughly suppress this shift shock, the friction coupling elements are kept for a considerably long period of time in a freely sliding state so that the friction coupling elements may be reduced or abraded rapidly.

Another technology is disclosed in Japanese Patent Laid-open Publication (kokai) No. 97,350/1984, which involves changing output of the combustion engine in synchronization with the shift operation of the automatic transmission, thereby easing the shift shock.

It is to be noted herein that, for the technology involving changing the output of the combustion engine in synchronization with the shift operation of the automatic transmission, it is necessary to accurately detect the point of starting and ending up the shift operation. In other words, as shown in FIG. 5, a peak as indicated by reference symbol "A" appears as protruding on the torque of the automatic transmission, in accompany with the start of the shift operation, when the reduction of the output of the combustion engine is delayed from the start of the shift operation. This protrusion of the torque of the automatic transmission may cause a so-called shift shock. Further, when the output of the combustion engine is returned prior to the end of the shift operation, the torque of the output shaft of the automatic transmission appears protruding as indicated by reference symbol "B" and this protrusion may cause a shift shock, too. It is also to be noted herein that it is actually difficult to directly detect the points of starting and ending up the shift operation, i.e. the states of coupling the friction coupling elements for performing the shift operation of the multi-stage shift mechanism. Hence, it is necessary to indirectly detect the points at which the shift operation of the automatic transmission has been started and ended.

The previous patent publication discloses the technique of indirectly detecting the points of starting and ending up the shift operation on the basis of a variation in a change ratio of the number of revolutions of the combustion engine. This technique can be said effective particularly when changes in the number of revolutions of the combustion engine can remarkably be recognized, i.e. when a peak can appear for the number of revolutions of the combustion engine, as in the case where the automatic transmission is upshifted during the course of acceleration. However, it is to be noted that the mode of driving during shift operation may be so irregular and diversified that a peak for the number of revolutions of the combustion engine does not always appear at the time of starting the shift operation. Hence, the aforesaid technique suffers from the difficulty of setting a threshold value. If the threshold value would be set too small, on the one hand, then a slight change in the number of revolutions of the combustion engine might be determined as the point of starting the shift operation or ending up the shift operation, thereby causing the risk of making too early determination. If the threshold value would be set too large, on the other hand, then the start and the end of the shift operation can be determined for the first time at the point when the number of revolutions of the combustion engine have changed largely so that the determination may be made too late.

SUMMARY OF THE INVENTION

Therefore, the present invention has the object to provide a system for controlling a combustion engine and an automatic transmission so adapted as to detect the points of starting and ending up a shift operation with high accuracy.

Another object of the present invention is to provide a system for controlling the combustion engine and the automatic transmission so adapted as to allow precise detection of the points of starting and ending up the shift operation, regardless of the mode of driving the automotive vehicle at the time of performing the shift operation, and as to secure synchronization of the changes in the output of the combustion engine with the shift operation.

In order to achieve the aforesaid objects, the present invention consists of a system for controlling a combustion engine and an automatic transmission, wherein output of a combustion engine is changed in synchronization with a start of a shift operation by a multistage shift mechanism of an automatic transmission when the shift operation by the multistage shift mechanism of the automatic transmission has been started and the output of the combustion engine is returned in synchronization with an end of the shift operation thereof when the shift operation thereof has been ended, comprising:

vehicle speed detecting means for detecting a vehicle speed;

detecting means for detecting the number of revolutions on the input side for detecting the number of revolutions of an input shaft of the multistage shift mechanism;

operating means for operating the virtual number of revolutions of the input shaft of the multistage shift mechanism on the basis of the vehicle speed detected by the vehicle speed detecting means and a gear ratio prior to the start of the shift operation;

comprising means for comparing the virtual number of revolutions operated by the operating means with the actual number of revolutions detected by the detecting means; and instructing means for instructing to change the output of the combustion engine when a difference between the actual number of revolutions and the virtual number of revolutions is recognized by the comparing means.

In summary, the input shaft of the multistage shift mechanism of the automatic transmission changes its number of revolutions in accompany with the start of its shift operation and the change in the number of revolutions of the input shaft of the automatic transmission is caused by a deviation of the actual number of revolutions from the virtual number of revolutions. The present invention is so arranged as to change the output of the combustion engine by deciding the shift operation as having been started when a difference between the virtual number of revolutions and the actual number of revolutions is recognized while continuously comparing the actual number of revolutions with the virtual number of revolutions.

The control system according to the present invention can precisely detect the point of starting the shift operation at which particularly the synchronization of the shift operation with the change in the output of the combustion engine is in issue.

Further, the control system according to the present invention can accurately and precisely detect the points at which the shift operation has been started and ended up, regardless of the mode of driving the automotive vehicle at the time of performing the shift operation.

As described hereinabove, the control system according to the present invention can readily secure the synchronization of the shift operation with the change in the output of the combustion engine and prevent occurrence of a shock to be caused by inappropriate synchronization thereof with the change in the output of the combustion engine.

Other objects, features and advantages of the present invention will become apparent in the course of the description of the preferred embodiments, which follows, with reference to the accompanying drawings.

DESCRIPTION OF THE PREFERRED EMBODIMENTS

The present invention will be described more in detail with reference to the accompanying drawings.

Figure 1:
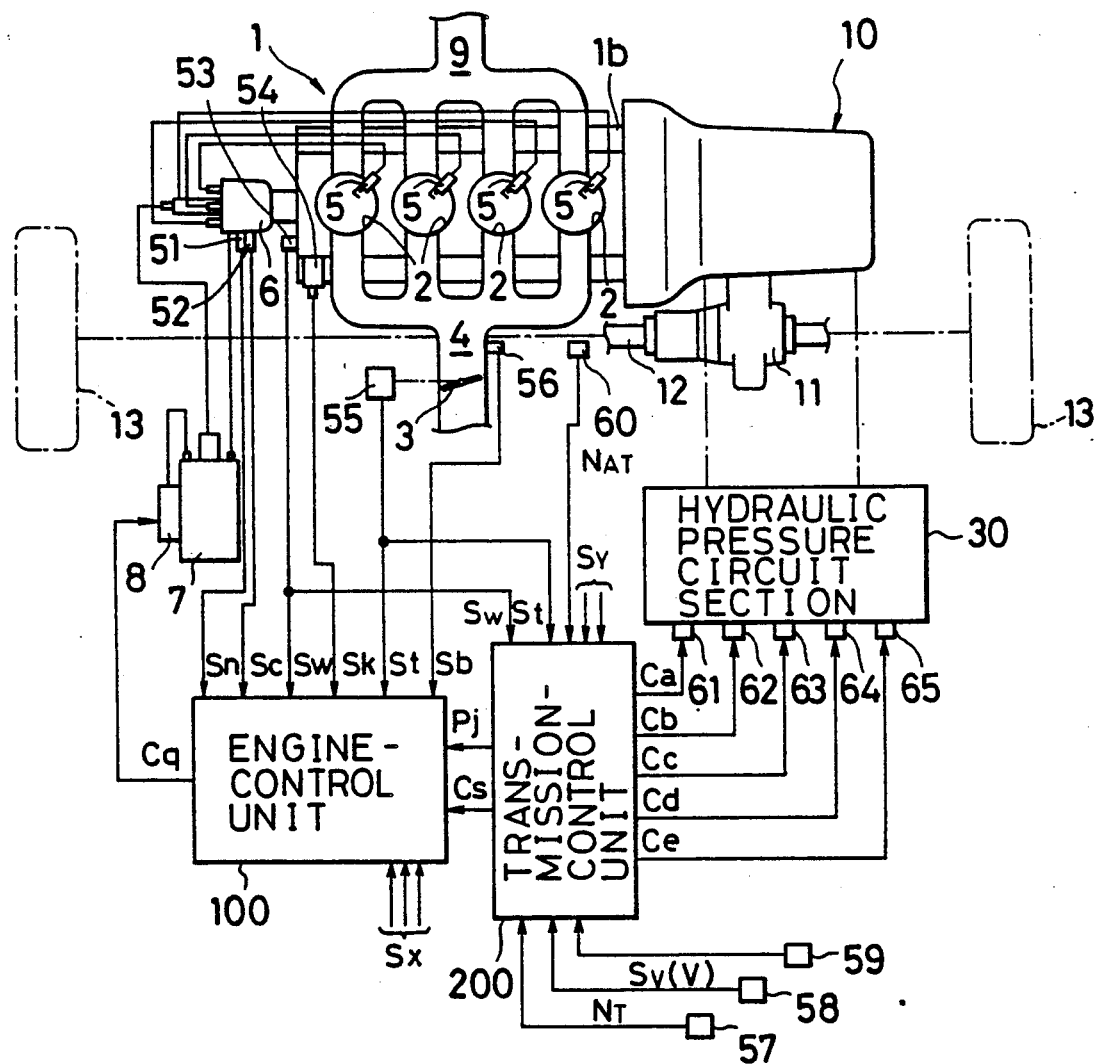
FIG. 1 is a diagrammatic representation showing a whole construction of the system according to an embodiment of the present invention.
Figure 2:
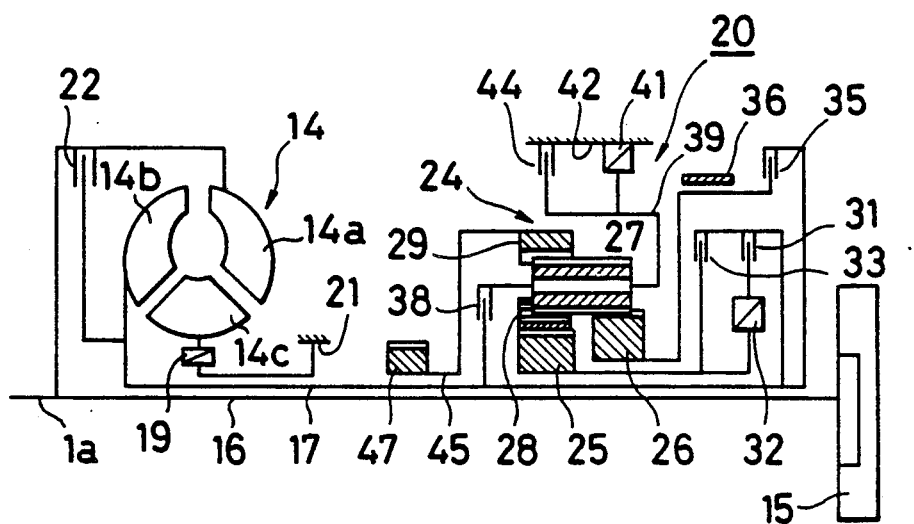
FIG. 2 is a diagrammatic representation showing an outline of a multistage shift mechanism according to an embodiment of the present invention.

As shown in FIG. 1, combustion engine 1 is a 4-cylinder combustion engine having four cylinders, generally referred to by reference numeral 2, to each of which mixed gases are supplied through an intake passage 4 in which a throttle valve 3 is mounted. The mixed gases fed to the cylinders 2 are ignited, exploded and burned in each of the cylinders 2 in predetermined order by operation of an ignition system comprising a spark plug 5, a distributer 6, an ignition coil section 7, and an ignition control section 8. Then, the mixed gases burned in the cylinders 2 are discharged into the outside through a discharge passage 9. The combustion of the mixed gases drives the combustion engine 1 and rotates a crank shaft 1a functioning as an output shaft of the combustion engine 1, as shown in FIG. 2. The axial torque of the crank shaft 1a is transmitted to driving wheels 13 through a power transmission passageway composed of an automatic transmission 10, a differential gear unit 11, a wheel axle 12, etc. In this embodiment, the automotive vehicle is of a front wheel drive type so that the driving wheels 13 are front wheels.

As shown in FIG. 2, the automatic transmission 10 contains a torque converter 14 and a shift mechanism 20 of a multi-stage gear type. To the automatic transmission 10 is mounted a hydraulic pressure circuit section 30 (FIG. 1) which in turn generates operating oil pressure to be employed by operating a shift of a multi-stage shift mechanism 20.

As shown in FIG. 2, the torque converter 14 comprises a pump impeller 14a, a turbine runner 14b, a stator 14c and a casing 21. The pump impeller 14a is connected to the crank shaft 1a to which an oil pump 15 is connected through a pump drive shaft 16. The oil pump 15 generates an operating oil pressure within the hydraulic pressure circuit section 30. The turbine runner 14b is connected to the shift mechanism 20 through a hollow turbine shaft 17 and to the crank shaft 1a through a lockup clutch 22. Between the stator 14c and the casing 21 is interposed a one-way clutch 19 which allows the stator 14c to rotate in the direction identical to the rotation of the pump impeller 14a and the turbine runner 14b while suppressing the rotation in the reverse direction.

The shift mechanism 20 has a planetary gear unit 24 which provides four forward speed ranges and one reverse speed range. The planetary gear unit 24 comprises a small-size sun gear 25, a large-size sun gear 26, a long pinion gear 27, a short pinion gear 28 and a ring gear 29. Between the small-size sun gear 25 and the turbine axle 17 is interposed a forward clutch 1 for forward running and a coasting clutch 33, and a one-way clutch 32 is interposed between the small-size sun gear 25 and the forward clutch 31. Between the large-size sun gear 26 and the turbine axle 17 are interposed a reverse clutch 35 for backward running and a 2-4 brake 36. Further, a 3-4 clutch 38 is interposed between the long pinion gear 27 and the turbine axle 17. The long pinion gear 27 is connected to a casing 42 of the automatic transmission through a carrier 39 and a one-way clutch 41. Between the carrier 39 and the transmission casing 42 is interposed a low reverse brake 44. The ring gear 29 is connected to an output gear 47 through an output shaft 45, and the torque transmitted to the output shaft 45 is transmitted to the differential gear unit 11 through an idler (not shown).

In the shift mechanism 20 of the multistage gear type, a shift lever (not shown) assumes the position for each of range P (parking range), range R (reverse range), speed range N (neutral range), speed range D (drive range), speed range 2 and speed range 1, and the forward clutch 31, the coasting clutch 33, the reverse clutch 35, the 2-4 brake 36, the 3-4 clutch 38 and the low reverse brake 44 are appropriately chosen and operated. For instance, the drive range D can assume four speed stages, i.e. first, second, third and fourth speed stages. The following table indicates the states of operation of the clutches 31, 33, 35 and 38 and the brakes 36 and 44 for assuming each of the positions of the ranges and each of the speed stages and the states of operation of the one-way clutches 32 and 41 when each of the ranges and the speed stages is assumed.

TABLE

| Range | Speed Stage | Clutches | | | | Brake | | One-Way Clutch | |
|---|---|---|---|---|---|---|---|---|---|
| | | 31 | 33 | 38 | 35 | 36 | 44 | 32 | 41 |
| P | — | | | | | | | | |
| R | — | | | | 0 | | 0 | | |
| N | — | | | | | | | | |
| D | 1 | 0 | | | | | | 0 | 0 |
| D | 2 | 0 | | | | 0 | | 0 | |
| D | 3 | 0 | 0 | 0 | | | | 0 | |
| D | 4 | 0 | | 0 | | 0 | | (0) | |
| 2 | 1 | 0 | | | | | | 0 | 0 |
| 2 | 2 | 0 | 0 | | | 0 | | 0 | |
| 2 | 3 | 0 | 0 | 0 | | | | 0 | |
| 1 | 1 | 0 | 0 | | | | 0 | 0 | |
| 1 | 2 | 0 | 0 | | | 0 | | 0 | |

Notes:
0 indicates the state of coupling.
(0) indicates the state of operating yet involving no transmission of power.

In order to perform control over the operation of the combustion engine 1 and the automatic transmission 10, there are provided an engine-control unit 100 and an transmission-control unit 200 which are composed, for example, of a microcomputer.

To the engine-control unit 100 are supplied a signal Sn indicative of the number of revolutions of the combustion engine detected by a sensor 51 mounted to the distributer 6, a signal Sc indicative of the angle of a crank detected by a sensor 52 mounted to the distributer 6, a signal Sw indicative of the temperature of cooling water for the combustion engine 1 sensed by a sensor 53 mounted in the engine block 1b, a signal Sk indicative of a magnitude of knocking sensed by a sensor 54 mounted in the engine block 1b, a signal St indicative of an opening angle of a throttle valve 3 sensed by a sensor 55 mounted in association with the throttle valve 3, a signal Sb indicative of negative pressure of intake air sensed by a sensor 56 mounted in a position downstream of the throttle valve 3, and a signal Sx necessary for the control of the combustion engine 1. The engine-control unit 100 sets a value $\theta$ for advancing the effective ignition for determining the spark timing on the basis of a pulse signal Pj for retarding the shift and a signal Cs indicative of shift data to be supplied from the transmission-control unit 200. The engine-control unit 100 creates a signal Cq for controlling the spark timing in correspondence with the value $\theta$ for advancing the effective ignition and supplies the signal Cq to an ignition-control section 8. The supply of the signal Cq allows generation of secondary high-pressure pulses from an ignition coil section 7 at the timing corresponding to the signal Cq and the secondary high-pressure pulses are supplied to the spark plug 5 through the distributer 6.

To the transmission-control unit 200 are supplied signals detected by sensors 57 to 60, inclusive, as well as the signals detected by the sensors 53 and 55. Further, a signal Sy required for controlling the automatic transmission 10 is supplied to the transmission-control unit 200. The sensor 57 is to detect the number of revolutions of the turbine, $N_T$, of the torque converter 14. The sensor 58 is to detect the vehicle speed V. The sensor 59 is to sense the range position of a shift lever. The sensor 60 is to detect the number of revolutions of the output shaft, $N_{AT}$, of the automatic transmission 10. The transmission-control unit 200 performs the shift control by forming drive pulse signals Ca, Cb, Cc and Cd on the basis of the signals detected and selectively supplying the drive pulse signals to solenoid valves 61, 62, 63 and 64 built in the hydraulic pressure circuit section 30, respectively, for shifting the supply of operating liquid pressure and the discharge thereof to and from the various clutches 31, 33, 38 and 35, built in the shift mechanism 20, as well as to and from the brakes 36 and 44. Further, the transmission-control unit 200 generates a drive pulse signal Ce and selectively supplies the drive pulse signal Ce to a solenoid valve 65 for shifting the supply of operating liquid pressure and the discharge thereof to and from a lockup clutch 22 built in the hydraulic pressure circuit section 30, thereby performing the lockup control of the automatic transmission 10.

Figure 3:
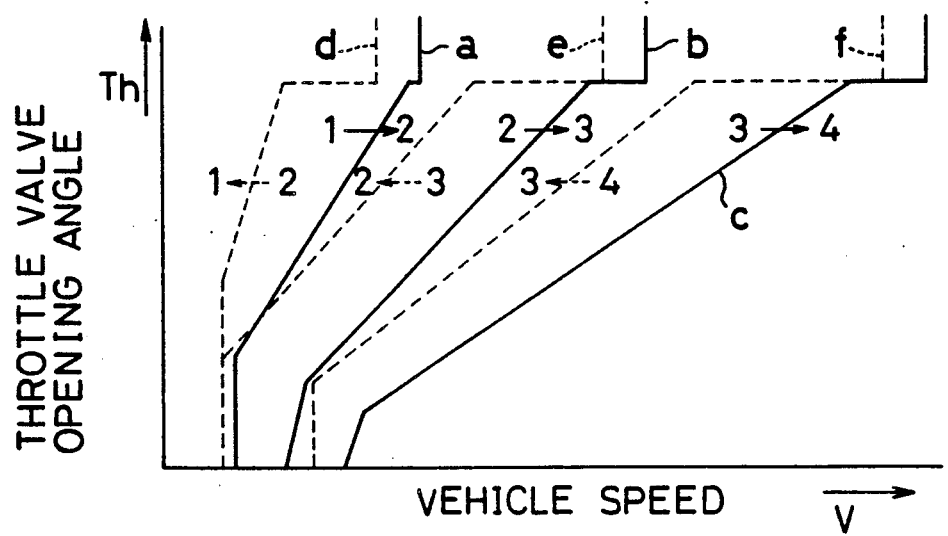
FIG. 3 is a map to be employed for shift operation.

A shift pattern is employed for performing the shift control, and the shift pattern is mapped in a built-in memory of the transmission-control unit 200. More specifically, the shift pattern comprises the relationship between the opening angle of the throttle valve, Th, expressed on the axis of ordinates and the vehicle speed V; expressed in the axis of abscissas. As shown in FIG. 3, the shift lines are expressed by reference symbols a, b, c, d, e and f, in which the shift line a expresses the upshift from the first speed stage to the second speed stage, the shift line b expresses the upshift from the second speed stage to the third speed stage, the shift line c expresses the upshift from the third speed stage to the fourth speed stage, the shift line d expresses the downshift from the second speed stage to the first speed stage, the shift line e expresses the downshift from the third speed stage to the second speed stage, and the shift line f expresses the downshift from the fourth speed stage to the third speed stage. It is decided to determine if the conditions for downshifting or upshifting have been established by collating the opening angle of the throttle valve, Th, indicated by the signal St, and the vehicle speed V indicated by the signal Sv with the shift lines a to f. Further, the transmission-control unit 200 supplies the signal Cs indicative of the shift data on the current speed stage.

Brief description will now be made of the outline of the control in this embodiment by taking the upshifting from the third speed stage to the fourth speed stage as an example. When the state of driving the automotive vehicle crosses the upshifting line c, an upshifting signal is transmitted to the solenoid valve 61, etc., thereby shifting each of friction coupling elements 33 of the shift mechanism 20 and upshifting from the third speed stage to the fourth speed stage. On the other hand, during the period of time when the friction coupling elements 33 are shifted, i.e. during the period of time when the third speed stage has been upshifted to the fourth speed stage, correction is made so as to retard the timing for ignition, thereby reducing the torque of the combustion engine. It is noted herein that the way of reducing the torque of the combustion engine is per se known so that duplicate description will be omitted from the following description for brevity of explanation.

Description will be made of the way of detecting the point of starting the shift operation and the point of ending up the shift operation.

Figure 5:
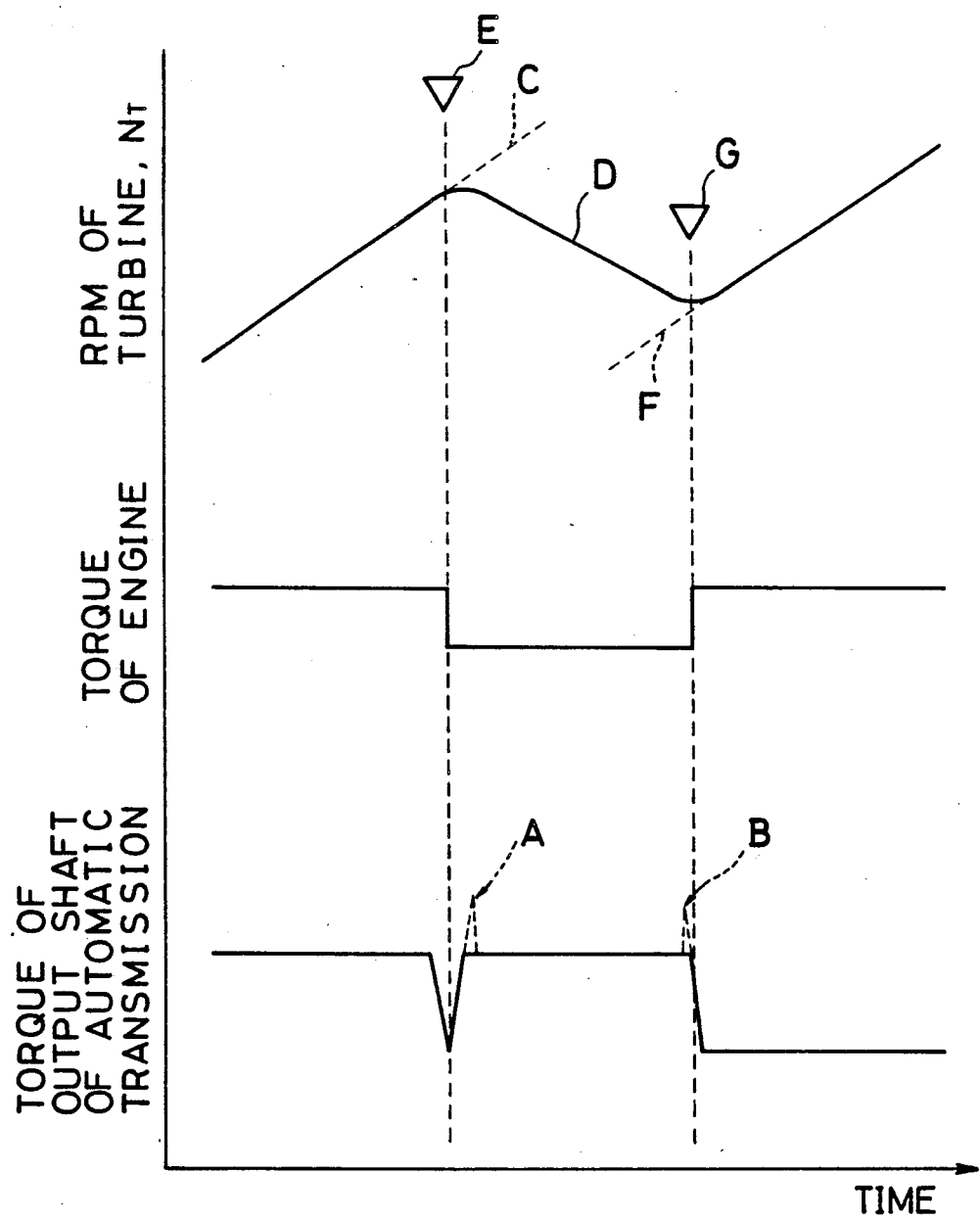
FIG. 5 is a timing chart for describing the embodiment of the present invention and problems inherent in conventional technique.

The point of starting the shift operation is detected by continuously determining the theoretically virtual number of revolutions of the turbine, $N_{T(3)}$, as indicated by the broken line C in FIG. 5, on the basis of calculation at the third speed stage prior to the shift and comparing the virtual number of revolutions of the turbine, $N_{T(3)}$, with an actual number of revolutions of the turbine, $N_T$, as indicated by the broken line D in FIG. 5. As the difference between the virtual number of revolutions of the turbine, $N_{T(3)}$, and the actual number of revolutions of the turbine, $N_T$, is recognized as a result of comparison, then it is determined that the shift operation has started. In FIG. 5, the point E is the point where the shift operation has been regarded as starting. On the other hand, the point of ending up the shift operation is detected by continuously determining the theoretically virtual number of revolutions of the turbine, $N_{T(4)}$, as indicated by the broken line F in FIG. 5, on the basis of calculation at the fourth speed stage subsequent to the shift and comparing the virtual number of revolutions of the turbine, $N_{T(4)}$, with an actual number of revolutions of the turbine, $N_T$. The shift operation is regarded as having been ended when the difference between the virtual number of revolutions of the turbine, $N_{T(4)}$, and the actual number of revolutions of the turbine, $N_T$, has been recognized as a result of comparison. The point G in FIG. 5 is the point at which the shift operation is regarded as having been ended. It is noted herein that a virtual number of revolutions of the turbine, $N_{T(i)}$, corresponding to the speed stage (i), to be employed for detecting the points of starting and ending up the shift operation has always been learned as its correction coefficient, $K(i)$, so as to correspond the virtual number of revolutions of the turbine, $N_{T(i)}$, to the actual number of revolutions of the turbine, during the period of time when the automotive vehicle is travelling while performing no shift.

Figure 4:
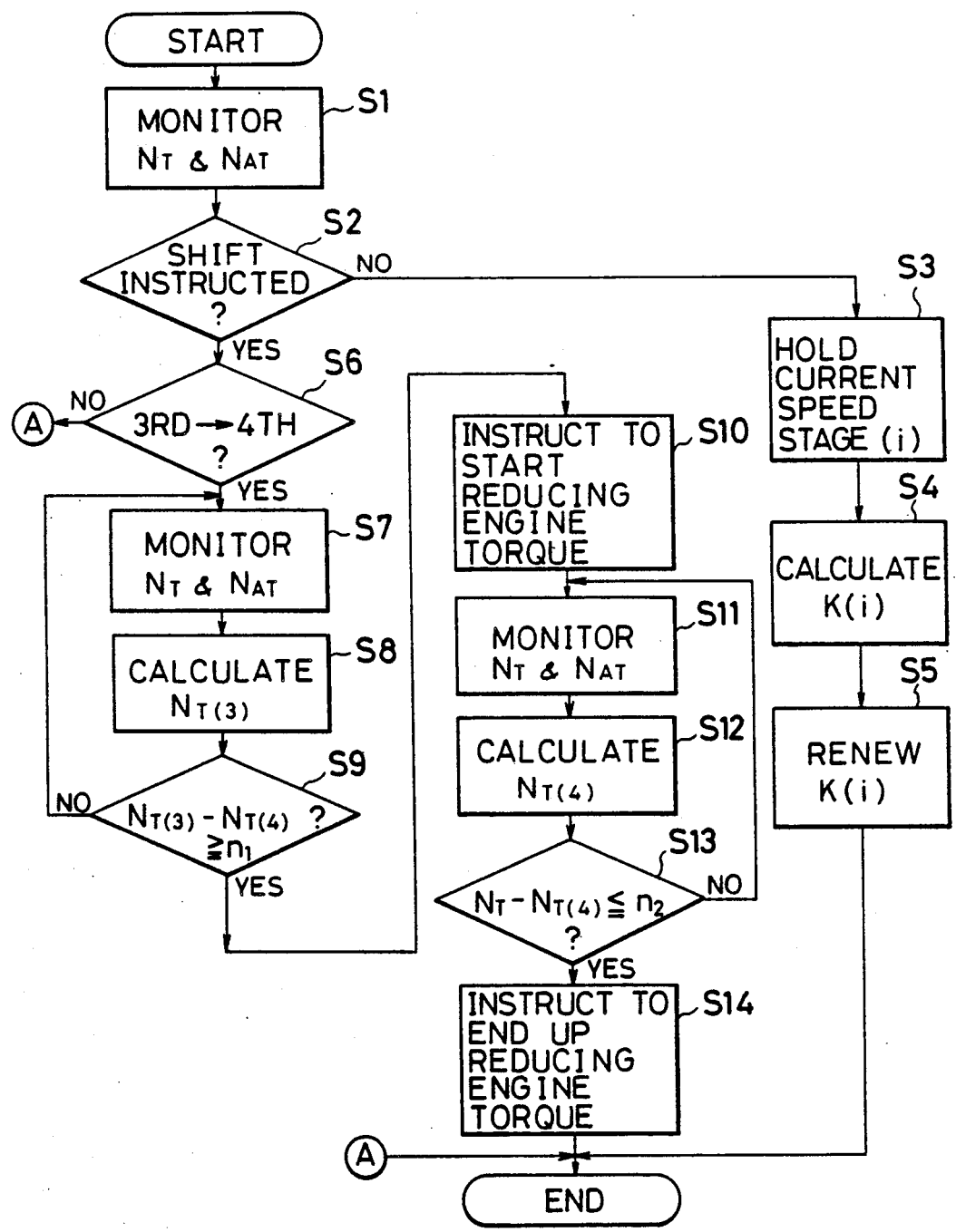
FIG. 4 is a flowchart showing an example of upshifting from the third speed stage to the fourth speed stage.

Given the foregoing, specific description will be made of an example of the shift control for upshifting from the third speed stage to the fourth speed stage in conjunction with the flowchart as shown in FIG. 4.

First, at step S1, the number of revolutions of the turbine, $N_T$, and the number of revolutions of the output shaft of the automatic transmission 10, $N_{AT}$, are monitored. Then, at step S2, a decision is made to determine if an instruction of performing a shift has been given. When it is decided at step S2 that no instruction has been given, then the program flow advances to step S3 at which the current speed stage (i), e.g. the third speed stage, i.e. (i) being represented as (3), is held, followed by proceeding to step S4 at which the correction coefficient, $K(i)$, at the speed stage (i) is calculated on the basis of the following formula:

$$K(i) = N_T/(N_{AT} \times \text{gear ratio at speed stage (i)}).$$

This correction coefficient, $K(i)$, is renewed one after another as a learning value at step S5.

On the other hand, when the result of decision at step S2 indicates that the instruction to perform the shift has been given, i.e. when it is determined that the state of driving the automotive vehicle comes in a state of passing through either one of the shift lines a to f, inclusive, as shown in FIG. 3, then the program flow goes to step S6 at which the shift control is performed by generating the shift signal to the solenoid valve 61, etc. so as to correspond to the shift mode in accordance with the shift line through which the state of driving the automotive vehicle has passed. For example, if it is determined that the shift line concerned is the upshift line c indicative of the upshift from the third speed stage to the fourth speed stage, the program flow goes from step S6 to step S7 at which the number of revolutions of the turbine, $N_T$, and the number of revolutions of the transmission, $N_{AT}$, are monitored, followed by proceeding to step S8 at which the theoretically virtual number of revolutions of the turbine, $N_{T(3)}$, based on the calculation at the third speed stage prior to the shift operation, is calculated as follows:

$$N_{T(3)} = K(3) \times N_{AT} \times \text{gear ratio at third speed stage}$$

(wherein $K(3)$ is a learning value of the correction coefficients at the third speed stage).

Then, at step S9, the virtual number of revolutions of the turbine, $N_{T(3)}$, given at step S8 is then compared with the actual number of revolutions of the turbine, $N_T$, and a decision is made to determine if the difference between the virtual number of revolutions of the turbine, $N_{T(3)}$, and the actual number of revolutions of the turbine, $N_T$, is equal to or larger than a preset value, $n_1$. If it is decided at step S8 that the difference is smaller than the preset value, $n_1$, then the program flow returns to step S7 at which the virtual number of revolutions of the turbine, $N_{T(3)}$, is calculated continuously. On the other hand, if the result of decision at step S8 indicates that the difference is equal to or larger than the preset value, n1, then the program flow advances to step S10 at which an instruction is given to reduce the torque of the combustion engine because it is determined that the shift operation from the third speed stage to the fourth speed stage has started, as shown in FIG. 5. Then, the program flow advances to step S11 at which the actual number of revolutions of the turbine, $N_T$, and the actual number of revolutions of the transmission, $N_{AT}$, are monitored, followed by proceeding to step S12 at which a theoretically virtual number of revolutions of the turbine, $N_{T(4)}$, based on calculation at the fourth speed stage subsequent to the shift operation, is calculated as follows:

$$N_{T(4)} = K(4) \times N_{AT} \times \text{gear ratio at fourth speed stage}$$

(wherein $K(4)$ is a learning value of the correction coefficients at the fourth speed stage).

Then, at step S13, the virtual number of revolutions of the turbine, $N_{T(4)}$, given at step S12 is compared with the actual number of revolutions of the turbine, $N_T$. If it is decided at step S13 that the difference between the virtual number of revolutions of the turbine, $N_{T(4)}$, and the actual number of revolutions of the turbine, $N_T$, is larger than a preset value $n_2$, on the one hand, then the program flow returns to step S11 at which the virtual number of revolutions of the turbine, $N_{T(4)}$, is continuously calculated. If the result of decision at step S12 indicates that the difference between the virtual number of revolutions of the turbine, $N_{T(4)}$, and the actual number of revolutions of the turbine, $N_T$, is equal to or smaller than the preset value n₂, on the other hand, then the program flow goes to step S14 at which an instruction is given to end up reducing the torque of the combustion engine because it is determined that the shift operation from the third speed stage to the fourth speed stage has been finished, as shown in FIG. 5.

As described hereinabove, the control system according to the present invention is so adapted as to detect the start and the end of the shift operation by comparing the virtual number of revolutions of the turbine with the actual number of revolutions of the turbine, so that the start and the end of the shift operation can be detected with high precision and accuracy regardless of the mode of driving during the shift operation. Further, the correction coefficient K(i) at each of the speed stages is learned and the virtual number of revolutions of the turbine is determined using the correction coefficient K(i) as a learning value, so that errors based on the between the virtual number of revolutions of the turbine and the actual number of revolutions of the turbine can be avoided, thereby improving accuracy in detection.

The present invention may be embodied in other specific forms without departing from the spirit and scope thereof. The present embodiments as described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. A system for controlling a combustion engine and an automatic transmission, wherein output of a combustion engine is changed in synchronization with a start of a shift operation by a multistage shift mechanism of an automatic transmission when the shift operation by the multistage shift mechanism of the automatic transmission has been started and the output of the combustion engine is returned in synchronization with an end of the shift operation thereof when the shift operation thereof has been ended, comprising:

vehicle speed detecting means for detecting a vehicle speed;

detecting means for detecting the number of revolutions on the input side for detecting the number of revolutions of an input shaft of the multistage shift mechanism;

operating means for operating the virtual number of revolutions of the input shaft of the multistage shift mechanism on the basis of the vehicle speed detected by the vehicle speed detecting means and a gear ratio prior to the start of the shift operation;

comparing means for comparing the virtual number of revolutions operated by the operating means with the actual number of revolutions detected by the detecting means; and instructing means for instructing to change the output of the combustion engine when a difference between the actual number of revolutions and the virtual number of revolutions is recognized by the comparing means.

2. A system as claimed in claim 1, wherein the output of the combustion engine is changed by correcting an ignition timing.

3. A system as claimed in claim 1, wherein:

the shift operation reduces the output of the combustion engine in synchronization with the start of the shift operation and returns the output of the combustion engine in synchronization with the end of the shift operation, when the shift is made from a low speed stage to a high speed stage.

4. A system as claimed in claim 3, wherein the shift operation reduces the output of the combustion engine by retarding the ignition timing in synchronization with the shift operation when the shift is made from a low speed stage to a high speed stage.

5. A system as claimed in claim 1, wherein the automatic transmission contains the multistage shift mechanism comprising a planetary gear mechanism and assumes a desired speed stage by coupling or uncoupling the friction coupling elements mounted to the planetary gear mechanism.

6. A system as claimed in claim 1, wherein the torque converter is interposed between the combustion engine and the automatic transmission.

7. A system as claimed in claim 6, wherein the virtual number of revolutions is given on the basis of the number of revolutions of the output shaft of the automatic transmission and a gear ratio prior to the shift.

8. A system as claimed in claim 7, wherein the detecting means detects the number of revolutions of the input shaft of the multistage shift mechanism by detecting the number of revolutions of a turbine of the torque converter.

9. A system as claimed in claim 8, further comprising correction coefficient operating means for operating a correction coefficient from the virtual number of revolutions and the number of revolutions of the turbine when no shift is performed;

wherein the operating means for operating the virtual number of revolutions operates the virtual number of revolutions by reflecting the correction coefficient.

10. A system as claimed in claim 9, further comprising learning means for learning the correction coefficient obtained by the correction coefficient operating means.

* * * * *